(12) United States Patent
Sung et al.

(10) Patent No.: US 6,369,476 B1
(45) Date of Patent: *Apr. 9, 2002

(54) HIGH TEMPERATURE SUPERCONDUCTOR BEARINGS

(75) Inventors: Tae Hyun Sung; Sang Chul Han; Jun Sung Lee; Ok Bae Hyun; Jin Joong Kim, all of Daejeon (KR)

(73) Assignee: Korea Electric Power Corporation, Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,113

(22) Filed: Apr. 7, 1999

(30) Foreign Application Priority Data

Apr. 8, 1998 (KR) .............................................. 98-12424
Jun. 9, 1998 (KR) .............................................. 98-21348

(51) Int. Cl.[7] .................................................. H02K 7/09
(52) U.S. Cl. ...................................................... 310/90.5
(58) Field of Search ........................ 310/90.5; 505/150, 505/166

(56) References Cited

U.S. PATENT DOCUMENTS

| | | | | |
|---|---|---|---|---|
| 5,117,139 A | * | 5/1992 | Flom et al. ................. | 310/90.5 |
| 5,177,387 A | * | 1/1993 | McMichael et al. ....... | 310/90.5 |
| 5,214,981 A | * | 6/1993 | Weinberger et al. .......... | 74/572 |
| 5,220,232 A | * | 6/1993 | Rigney, II et al. .......... | 310/90.5 |
| 5,256,638 A | * | 10/1993 | Weinberger et al. ....... | 310/90.5 |
| 5,430,008 A | * | 7/1995 | Morris ....................... | 505/150 |
| 5,479,059 A | * | 12/1995 | Weinberger ................. | 310/90.5 |
| 5,559,384 A | * | 9/1996 | Boland et al. ............. | 310/90.5 |
| 5,710,469 A | * | 1/1998 | Ries ........................... | 310/90.5 |
| 5,838,082 A | * | 11/1998 | Ho et al. .................... | 310/90.5 |
| 5,872,081 A | * | 2/1999 | Woolf ........................ | 505/450 |

* cited by examiner

*Primary Examiner*—Karl Tamai
(74) *Attorney, Agent, or Firm*—Dykema Gossett PLLC

(57) ABSTRACT

A high temperature superconductor bearing is disclosed which provide a strong levitation force and thus enable the construction of a horizontal-axle flywheel energy storage system. The bearing includes a magnet journal made of high temperature superconductor films, and a stator formed of a plurality of high temperature superconductors installed opposite to the high temperature superconductor magnet journal or the magnet journal for thereby off-setting the force such as the weight applied to the rotor using a magnetic pressure.

8 Claims, 12 Drawing Sheets

(PRIOR ART)

(PRIOR ART)

(PRIOR ART)

(PRIOR ART)

(PRIOR ART)

HIGH TEMPERATURE SUPERCONDUCTOR BEARINGS

BACKGROUND OF THE INVENTION

1. Field of the Invention

The present invention relates to high temperature superconductor bearings that can produce strong levitation forces. This kind of bearings can be utilized to support rotating machinery with no mechanical contact, including flywheel energy storage systems which can convert electrical energy into kinetic energy of a rotating member and re-convert the kinetic energy into electrical energy.

2. Description of the Background Art

Bearings are an integral part for all rotating devices. In order to reduce the energy loss caused by the friction of the rotating members of the devices, ball bearings or journal bearings with fluid are used. In this case, since a force is exerted owing to the mechanical contact, there is a limitation in reducing the friction.

Therefore, non-contact bearings have been introduced which use permanent magnets and electromagnets. In these bearings, a rotating member is levitated by an attractive or repulsive force produced by the magnet or the electromagnet for thereby implementing a non-contact rotation. In this case, an active control is used in order to stabilize the axle. This technique requires an expensive circuit and control devices, and the energy is continuously consumed by the system during the use of the bearings.

Recently, high temperature superconductors (HTS) which become perfectly diamagnetic under certain conditions, i.e. which exclude magnetic field from it, have been discovered. Using these materials, non-contact bearings which do not require an active control have been disclosed taking advantage of the property that once the magnetic field has penetrated the material, it is retained and pinned inside the material.

FIG. 1 illustrates an example of the magnetic flux pinning which is achieved using a permanent magnet 11 and a high temperature superconductor 12.

As the magnetic field generated by the permanent magnet 11 is pinned inside the high temperature superconductor 12, the magnet 11 is held close to the HTS with an elastic force below the critical temperature where superconductivity takes place. Since the magnet 11 does not receive a kinetic resistance in the direction in which there is no variation of the magnetic flux density, it is possible to make a rotation with no mechanical friction.

FIGS. 2A through 2C illustrate the conventional thrust bearing. FIG. 2A shows a bottom view and a cross-sectional view illustrating a plurality of permanent magnets 21. In this construction, the problem that the rotor magnet can not be made of single permanent magnet is overcome. In the rotor 22, a plurality of permanent magnets 21 made of similar magnets having a predetermined characteristic are installed at a predetermined interval.

FIG. 2B illustrates the magnetic flux density distribution by the rotor 22 including the permanent magnet 21. As seen in the magnetic flux density curve 23, a nonuniform magnetic flux density is formed in the rotational direction. Even if a plurality of circular-arc-shaped rotors tied together are used instead of the cylindrical magnets, the nonuniformity of the magnetic flux density does exist due to defects in the material and due to demagnetization, thereby causing rotational losses.

FIG. 2C is a perspective view illustrating how the rotor 22 including a plurality of magnets 21 are held above the high temperature superconductor 12.

FIG. 3 is a view illustrating a high temperature superconductor journal bearing using a permanent magnet according to the prior art. As shown in FIG. 4, the rotor 32 may be formed of a plurality of cylindrical magnets 31 or a plurality of ring shaped magnets 35 and is installed in a tubular high temperature superconductor 33.

FIGS. 4A and 4B illustrate the configuration of the rotors which may be adapted for the conventional high temperature superconductor journal bearing. FIG. 4A illustrates a magnet arrangement in which magnetic poles of the cylindrical magnets 31 contact opposite poles of the magnets. FIG. 4B is a view illustrating the magnet arrangement in which the same poles of the ring shaped magnet 35 contact each other around the rotor shaft 34. The rotor shaft 34 is made of a non-magnetic material or a diamagnetic material.

As shown in FIG. 4B, in the construction in which the like poles face each other, the magnetic flux diverge radially outward between the poles of the magnets so that it is possible to obtain a strong force compared to the construction in which the opposite poles contact as shown in FIG. 4A. A high permeability material such as $\mu$-metal or a ferromagnetic material is preferred to lower the magnetic reluctance.

In the conventional construction, the journal bearing rotor is constructed by arranging magnets like (N-S)/(N-S)/(N-S)/(N-S) as shown in FIG. 4A. In this case, however, the magnetic flux emerging from both ends of the rotor magnets only contribute to the magnetic force and it is impossible to effectively use the high temperature superconductor. Therefore, the ring shaped magnets 35 are stacked in opposing polarity, namely, in the configuration of (N-S)/(S-N)/(N-S)/(S-N) as shown in FIG. 4B, and the rotor shaft 34 is inserted into the hole.

In the case of the disc shaped thrust bearing as shown in FIG. 2C, the high temperature superconductor is inserted into the liquid nitrogen container, and the magnets are attached to the bottom of the rotor in such a manner that the pole surfaces of the magnets comprise the bottom surface of the rotor. Therefore, a force is generated between the rotor and the high temperature superconductor by the thusly generated magnetic field. In addition, in a thrust bearing, a superconductor magnet is placed lower as a stator instead of the high temperature superconductor, and then a high temperature superconductor is attached to the bottom of the rotor for thereby supporting the weight of the rotor. In this case, a predetermined shaped coil of superconductor film forms the superconductor magnet for thereby providing a straw hat-shaped magnetic density distribution, and then the high temperature superconductor of the rotor is inserted at the concave part.

In order to generate a strong magnetic force, a thrust bearing requires a strong magnet of large size. However, since it is difficult to fabricate a large size magnet having a uniform magnetization, a plurality of magnets are attached to the rotating plate. In this case, even when the magnets having the similar characteristics are attached, the nonuniformity of the magnetic flux density still exists due to defects in the material or due to the demagnetization, thereby causing a rotational loss.

In the prior art using a superconductor magnet for the stator, the magnetic flux density is uniformly formed in the rotational direction using the superconductor magnet, and there is an advantage in that it is possible to generate a very strong magnetic field compared to the regular magnets. However, in this case, diamagnetism in which the magnetic field is excluded from the superconductor is used, and it provides a stability only with the weight. When an asymmetrical magnetic flux pinning occurs in the high temperature superconductor attached to the rotor in the rotational direction, vibrational and rotational losses may occur.

In the case of the journal bearings, since a shaft is inserted at the center of the rotor magnet arrangement, the total volume of the magnets is reduced. When a strong force such as the weight, etc. is applied to the rotating member, the levitation force which is needed for the non-contact rotation of the rotating member is provided only based on the magnetic flux pinning of the high temperature superconductor and it is relatively weak.

In the case of the prior art thrust bearings, the rotational loss is large due to the nonuniformity of the magnetic flux density, and in the case of the journal bearings, it is very hard to obtain a strong levitation force.

SUMMARY OF THE INVENTION

It is an object of the present invention to provide high temperature superconductor bearings providing a strong levitation force and enabling development of horizontal-axle flywheel energy storage devices which overcome the aforementioned problems encountered in the prior art.

In the present invention, the non-contact journal bearing which levitates and supports the rotor using a predetermined interrelationship between a superconductor and a magnet is constructed as follows. A high temperature superconductor formed of high temperature superconductor film is used to make the rotor magnets. A plurality of magnets are stacked in opposing polarity as (N-S)/(S-N)/(N-S)/(S-N) with a predetermined gap between the opposing poles in a cylindrical container made of non-magnetic material, so that the magnetic field lines diverge out of the gaps mainly in the axial direction. The magnetic field of the rotor is fixed using a cylindrical stator made of one or a plurality of high temperature superconductor pieces for thereby preventing the escape of the rotating members and thus off-setting the force such as the weight, etc. using the magnetic pressure.

In the present invention, the magnets are installed opposite the outer circumferential surface of the cylindrical container of the stator made of high temperature superconductor, so that the attractive and repulsive forces applied to the rotor magnets are increased for thereby increasing the levitation force. In addition, the magnets are installed to be opposite at the upward and downward surfaces of the stator for thereby increasing the levitation force, and the pinning force is generated by the superconductor installed at the leftward and rightward surfaces of the rotor.

In the present invention, the horizontal-axle flywheel energy storage system is realized using the high temperature superconductor journal bearings as follows. A horizontal axle is used to support and lift the flywheel, thus having the rotational axle being perpendicular to the direction of its weight. One or a plurality of flywheels and a plurality of high temperature superconductor journal bearings are installed at the rotational axle, a non-contact motor/power generator is connected with the axle and is connected with a power conversion unit and a control unit installed outside the vacuum/safety container. In order to make a large capacity flywheel energy storage system, a plurality of flywheels and bearings are installed at the rotary axle for thereby increasing the rotational moment of inertia.

To achieve the above objects, there is provided a high temperature superconductor bearing generating a strong force and enabling the development of a horizontal axle flywheel energy storage system. It includes a journal formed of high temperature superconductor magnets made of high temperature superconductor film, and a semi-cylindrical stator formed of a plurality of high temperature superconductors installed opposite the high temperature superconductor magnet journal or the permanent magnet journal for thereby off-setting the force such as a weight applied to the rotor using a magnetic pressure.

To achieve the above objects, there is provided a horizontal axle flywheel energy storage system which includes a horizontal rotary axle, which supports the flywheel, and high temperature superconductor journal bearings installed at the horizontal axle for thereby supporting the weight of the rotating members.

Additional advantages, objects and features of the invention will become apparent from the description which follows.

BRIEF DESCRIPTION OF THE DRAWINGS

The present invention can be better understood from the detailed description given hereinbelow and the accompanying drawings which are given by way of illustration only, and thus are not limitative of the present invention, and wherein:

FIGS. 5A and 5B are perspective views illustrating the characteristic of a high temperature superconductor thrust bearing according to the present invention, of which:

FIG. 5A is a perspective view illustrating a high temperature superconductor magnet formed of a high temperature superconductor film; and FIG. 5B is a view illustrating the concept of a magnetic levitation between a high temperature superconductor magnet and a high temperature superconductor;

FIGS. 7A and 7B are views illustrating the construction of a journal bearing according to the present invention, of which:

FIG. 7A is a front view of the same; and

FIG. 7B is a cross-sectional view taken along the line A—A';

FIGS. 8A and 8B are views illustrating the construction of a hybrid type high temperature superconductor journal bearing using high temperature superconductors and magnets according to the present invention, of which;

FIG. 8A is a front view of the same; and

FIG. 8B is a cross-sectional view taken along the line B—B';

DETAILED DESCRIPTION OF THE PREFERRED EMBODIMENTS

Figure 5A:
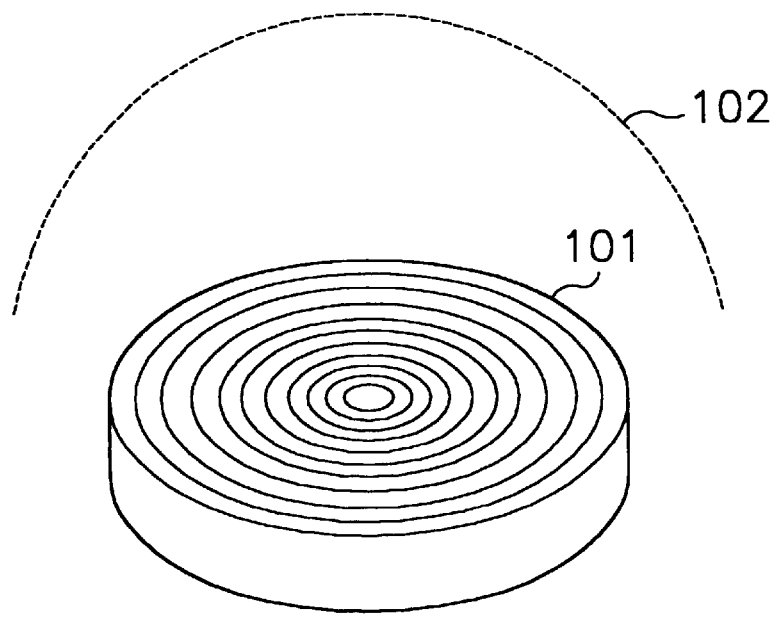

FIG. 5A is a view illustrating the construction of a high temperature superconductor magnet adapted in the present invention and a magnetic flux density distribution based on the high temperature superconductor magnet. In a driven-type superconductor magnet 101 formed of high temperature superconductor film and its magnetic flux density distribution 102, the magnetic flux density is uniformly formed in the rotational direction. The high temperature superconductor magnet has an advantage in that it has a strong magnetic field compared to the conventional permanent magnet.

Figure 5B:
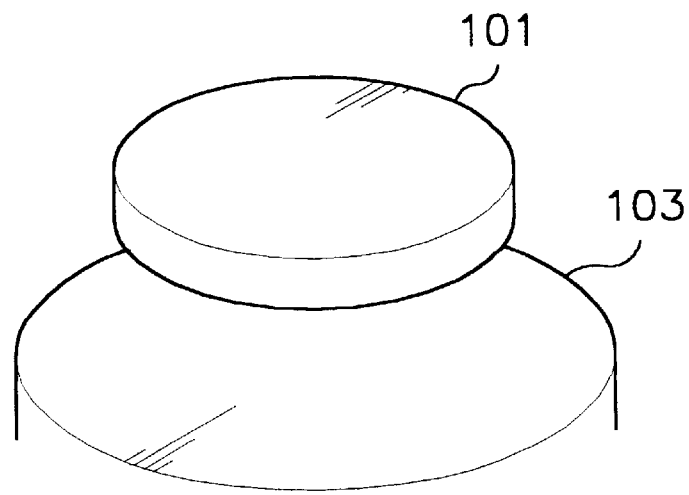
Figure 6:
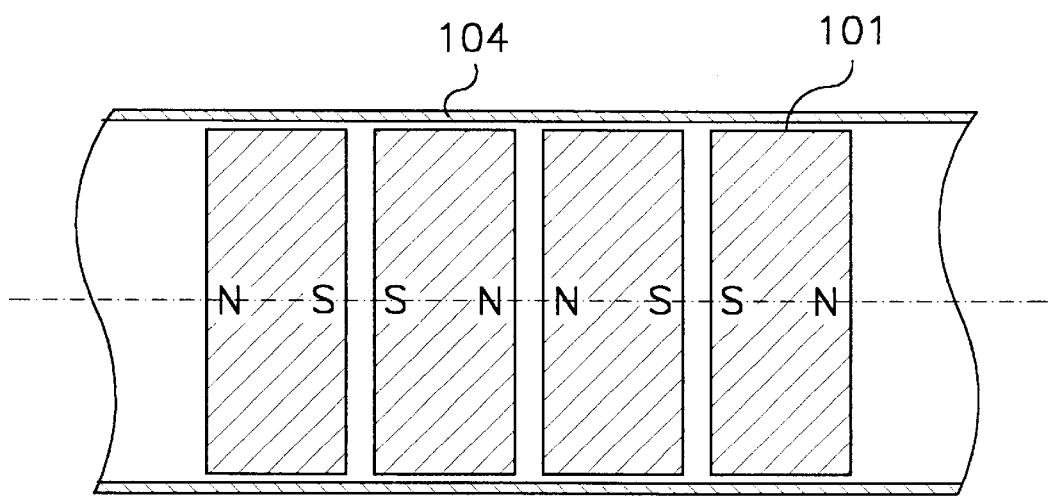
FIG. 6 is a cross-sectional view illustrating a rotor adapted for a journal bearing according to the present invention.

FIG. 5B is a view illustrating the magnetic pinning using the high temperature superconductor magnet 101 and the high temperature superconductor 103. Here, the high temperature superconductor 103 represents the stator. As shown in FIG. 6, various types of the high temperature superconductor journal bearings may be used.

FIG. 6 is a cross-sectional view illustrating the improved rotor made of high temperature superconductors by removing a magnetic flux path made by the inner shaft of the rotor and thus forming a stronger magnetic field distribution by the journal.

A plurality of high temperature superconductor magnets 101 are stacked in opposing polarity with predetermined gaps between the adjacent poles in the sequence of (N-S)/(S-N)/(N-S)/(S-N) in the interior of the non-magnetic cylindrical container 104, so that the magnetic field is generated in the axial direction of the journal.

In the thusly constituted rotor, the variation of the magnetic flux density is large in the radial direction near the surface of the rotor, and the operational force is increased based on the magnetic flux pinning of the stator made of high temperature superconductor.

Figure 7A:
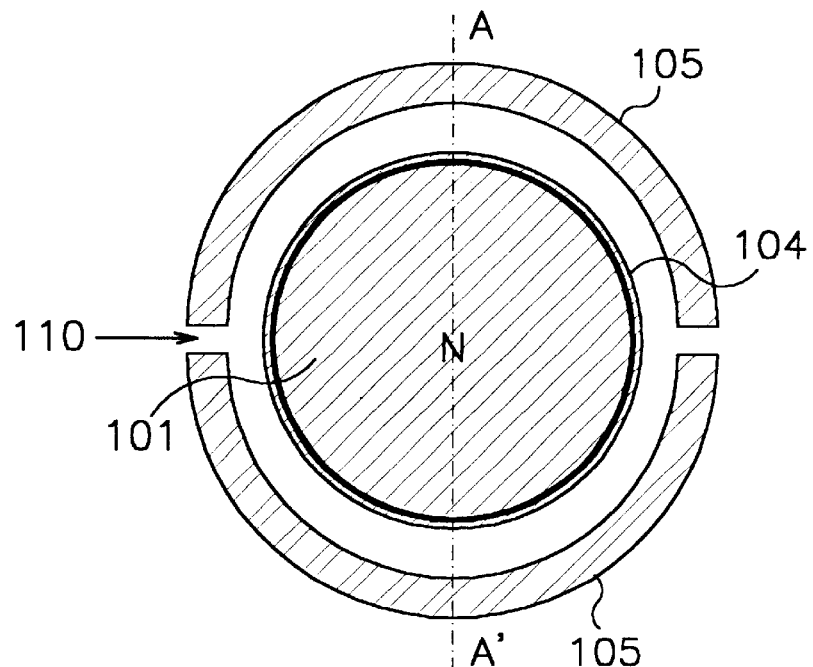

FIG. 7A is a cross-sectional view illustrating the structure of a high temperature superconductor journal bearing adapting the rotor of FIG. 6. High temperature superconductor pieces 105 are installed for magnetic flux pinning at the upper and lower parts outside the rotor 110. In order to off-set the force such as the weight applied to the rotating member by using the magnetic pressure, two semi-cylindrical structures containing high temperature superconductor pieces 105 are placed with a gap between them. Before the bearing is cooled under the magnetic field, the rotor 110 is positioned close to the upper semi-cylindrical structure. After the cooling is performed, the force is exerted such that the rotor 110 settles down in the predetermined position. Or, the high temperature superconductor stator 105 is positioned away from the rotor under the zero-field cooling, and then is moved to the position as shown in the drawing. That is, the upper and lower stators are moved according to the purpose of their use and a predetermined moving procedure.

The semi-cylindrical containers of the flux pinning high temperature superconductor 105 may be connected with each other. In addition, the magnetic flux pinning high temperature superconductor 105 may be made in a shape other than the semi-cylindrical one.

Figure 7B:
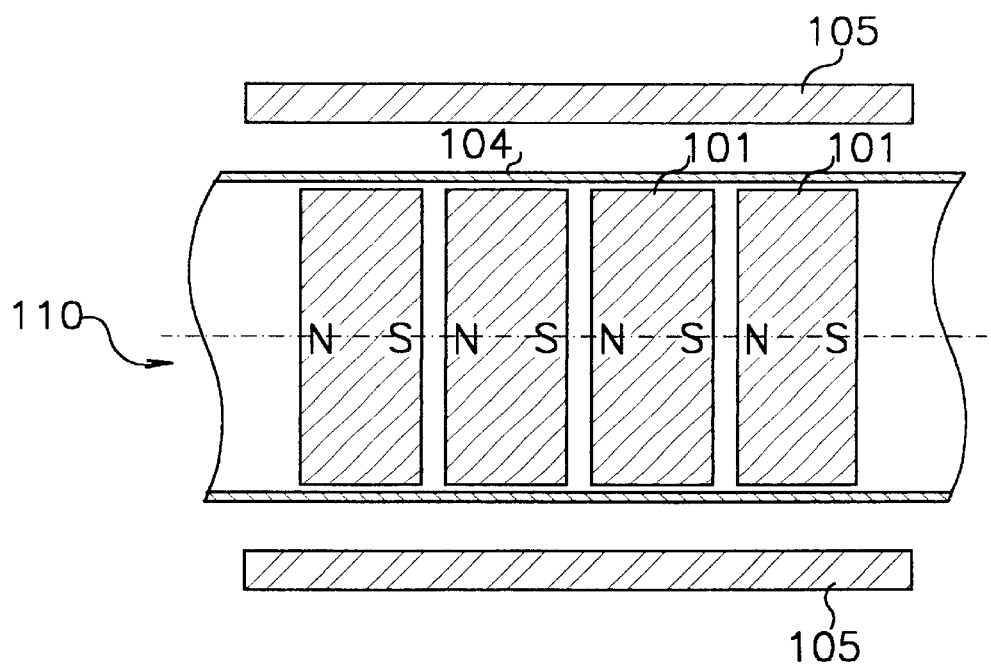

FIG. 7B is a cross-sectional view taken along the line A—A' of FIG. 7A and illustrates the configuration of the rotor 110. The rotor 110 is fixed in such a manner that the superconductor magnets 101 are stacked in opposing polarity in the non-magnetic container 104, and the magnetic flux pinning high temperature superconductor pieces 105 are installed at the upper and lower positions outside the rotor 110.

In another embodiment of the present invention, FIG. 8 illustrates the configuration in which the permanent and superconductor magnets are added to the structure of FIG. 7. In detail, FIG. 8 is a cross-sectional view illustrating the configuration of the hybrid-type high temperature superconductor journal bearing using high temperature superconductors and regular magnets.

The cylindrical high temperature superconductor 105 is installed around the rotor 110, and a plurality of magnets 106 and 107 are installed at the upper and lower sides of the high temperature superconductor 105. This configuration enables the generation of strong levitation force of non-contact nature even when other forces are acting on the rotor 110 in a predetermined direction like the weight.

Figure 8A:
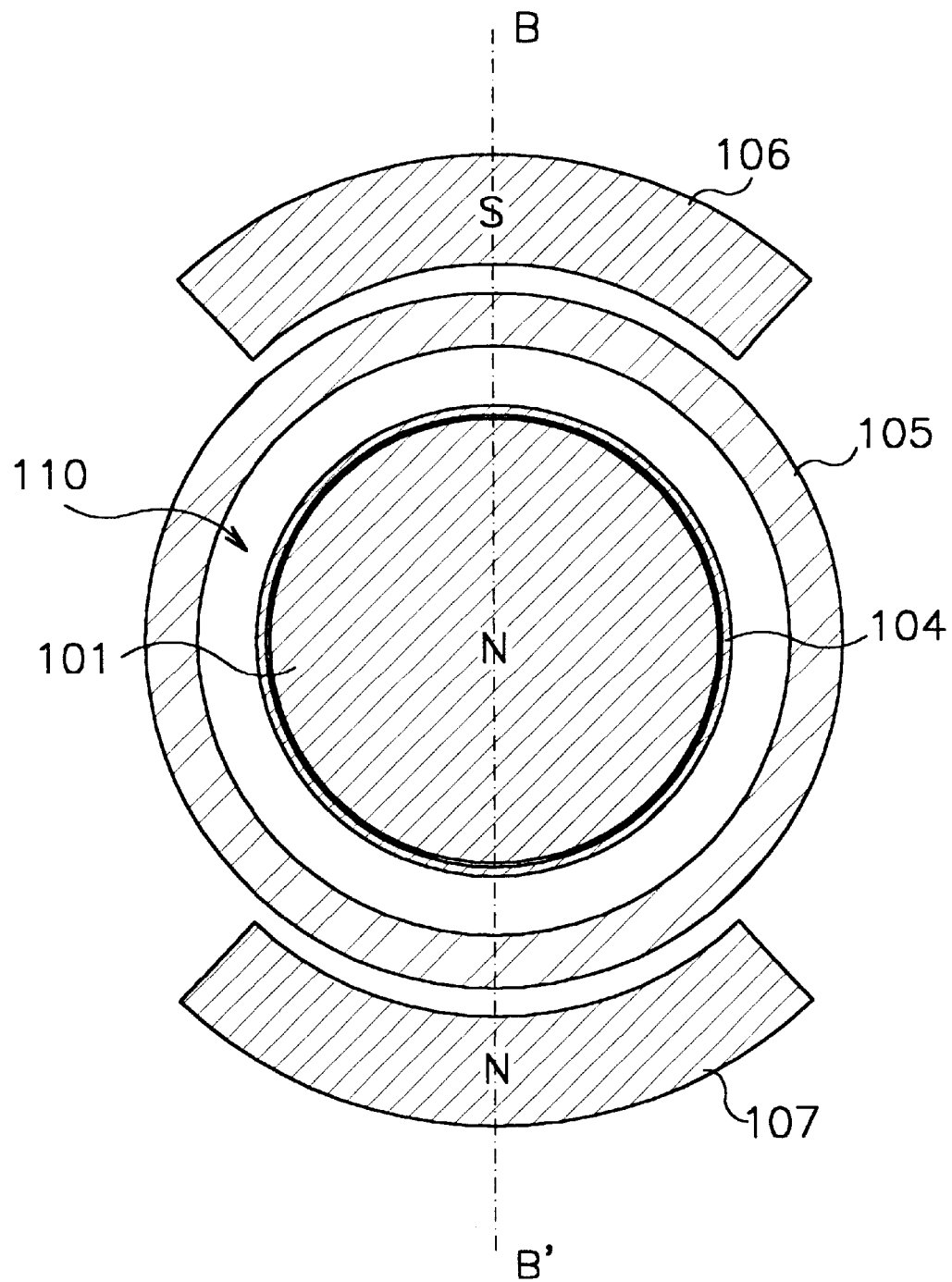
Figure 8B:
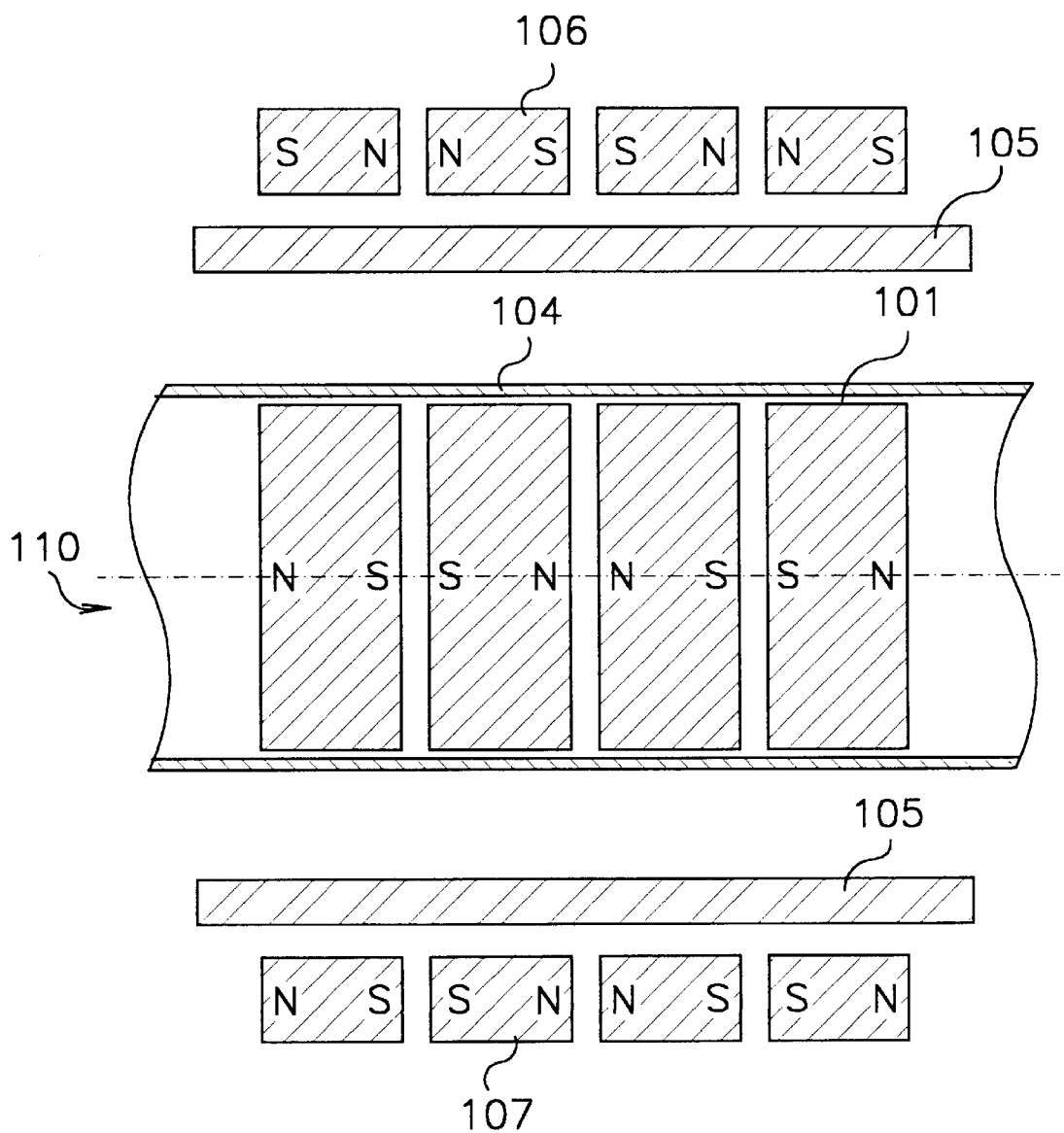

FIG. 8B is a cross-sectional view taken along the line B—B' of FIG. 8A. For the magnets 106 and 107, superconductor magnets may be used. A non-semi-cylindrical type may be used depending on the nature of the load. The high temperature superconductor magnets 101 and the magnets 106 and 107 are stacked in opposing polarity.

A magnetic force is applied between the magnets 106 and 107 and the high temperature superconductor magnet 101 in the rotor. An attractive force acts between the upper magnet 106 as shown in FIG. 8B and the high temperature superconductor magnet 101 in the rotor 110, and a repulsive force acts between the lower magnet 107 and the high temperature superconductor magnet 101 of the rotor 110.

The high temperature superconductor 105 pins the magnetic flux from the high temperature superconductor magnet 101 and is used to reduce the instability due to the force between the rotor magnet and the stator magnet.

In the present invention, A part of the high temperature superconductor 105 between the bearing stator upper and lower magnets 106 and 107 may be removed, and the distance between the stator magnet and the rotor may be decreased for thereby increasing the levitation force. Various modifications may be implemented depending on the purpose of the use and the characteristics.

In the structures as shown in FIGS. 6 through 8, for the magnets, a superconductor magnet, a superconductor electromagnet, a regular magnet, etc. may be used for thereby providing a predetermined magnetic force and quality.

The embodiments of the present invention may be summarized as follows.

Figure 1:
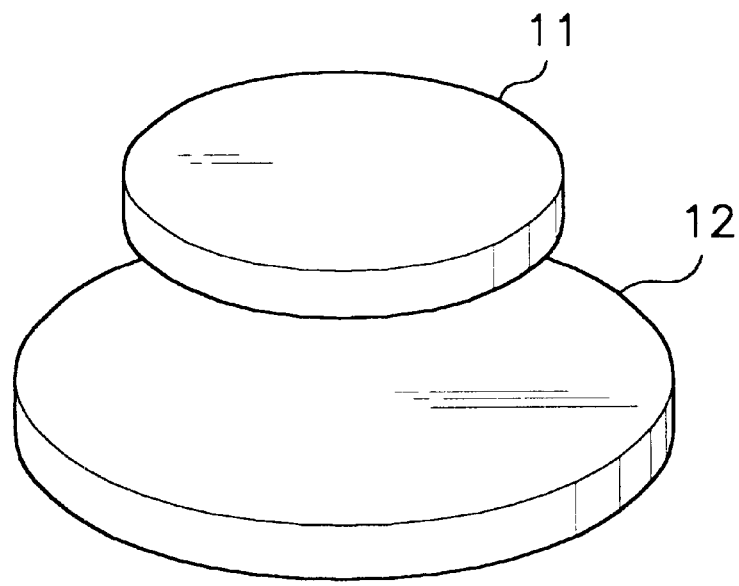
FIG. 1 is a view illustrating the concept of a levitation between a high temperature superconductor and a permanent magnet according to the prior art.
Figure 2A:
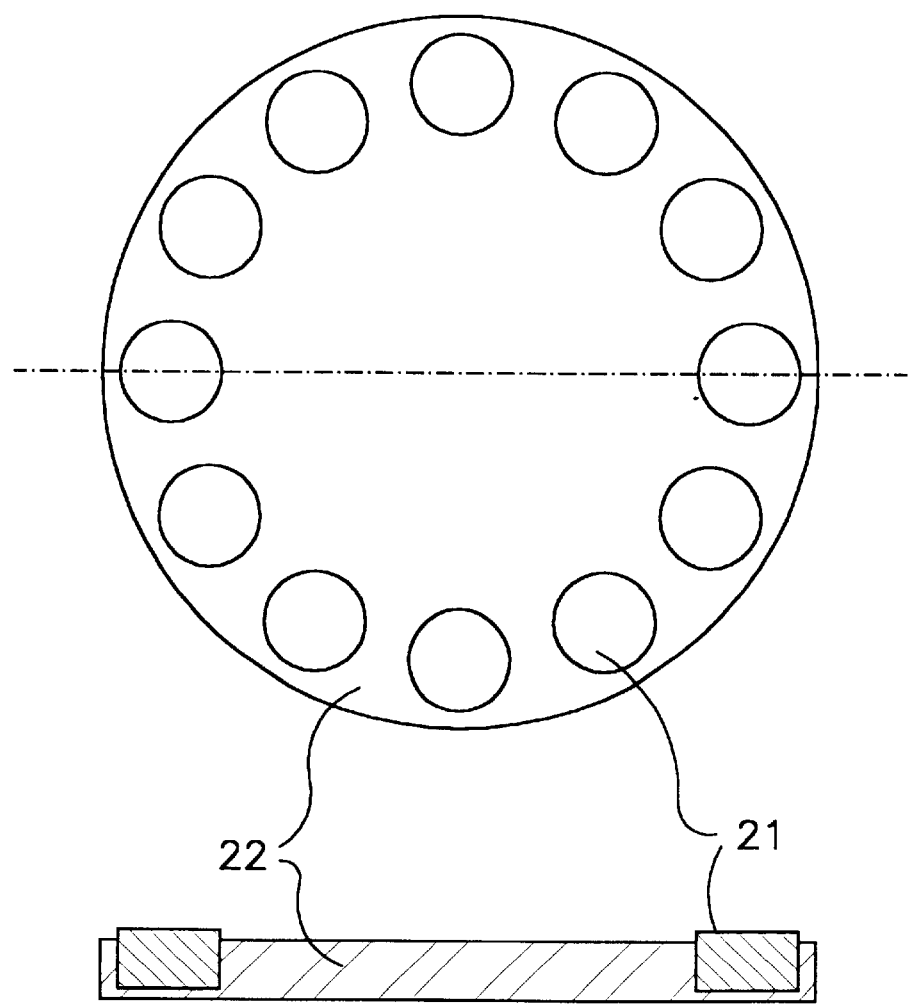
FIG. 2A is a schematic view illustrating a high temperature superconductor thrust bearing rotor according to the prior art.
Figure 2B:
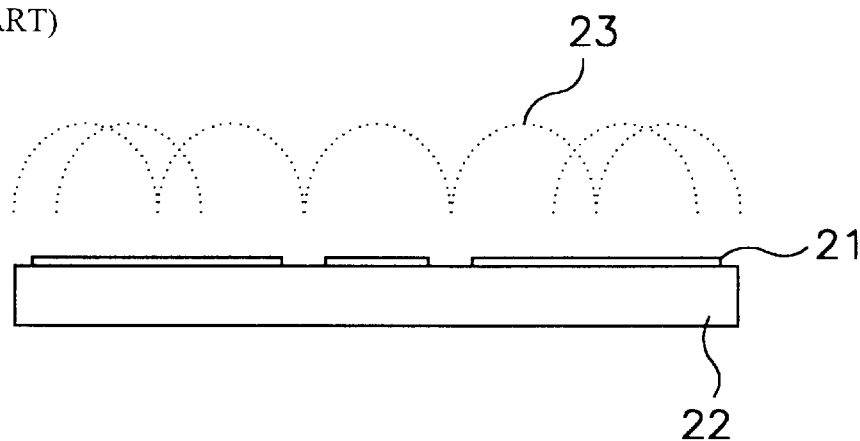
FIG. 2B is a schematic view illustrating a magnetic flux density distrubution.
Figure 2C:
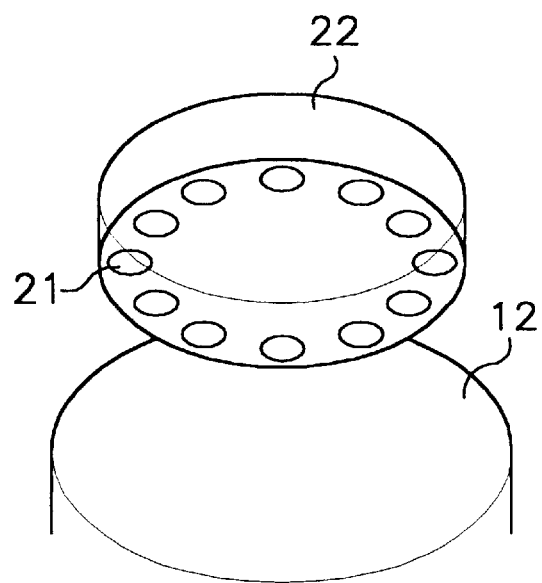
FIG. 2C is a perspective view illustrating the construction of a high temperature superconductor thrust bearing according to the prior art.
Figure 3:
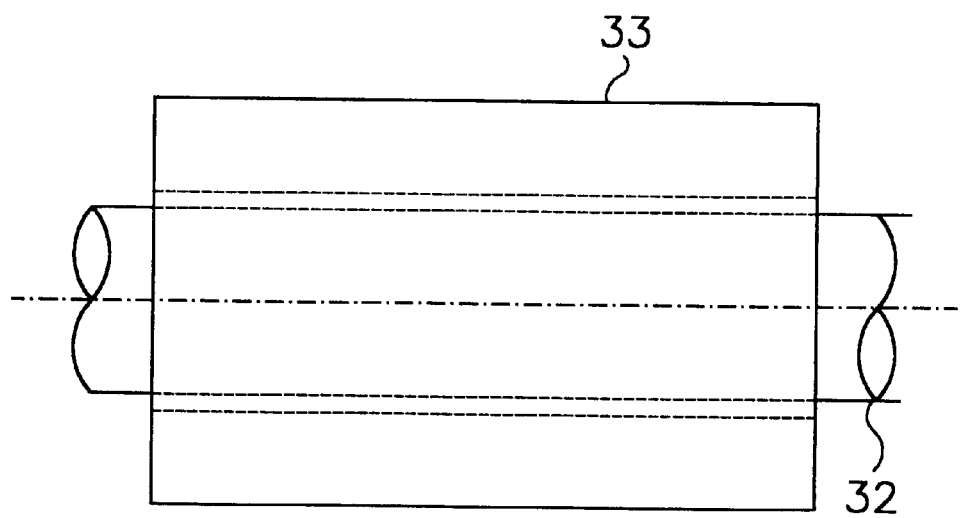
FIG. 3 is a schematic view illustrating a high temperature superconductor journal bearing according to the prior art.
Figure 4A:
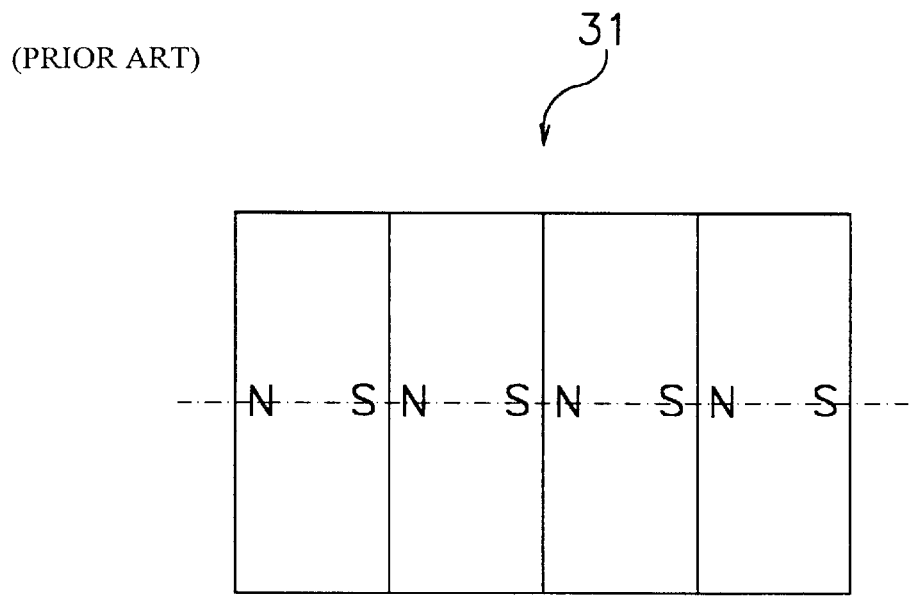
FIGS. 4A and 4B are views illustrating a magnet arrangement of a rotor used for a high temperature superconductor journal bearing according to the prior art.
Figure 4B:
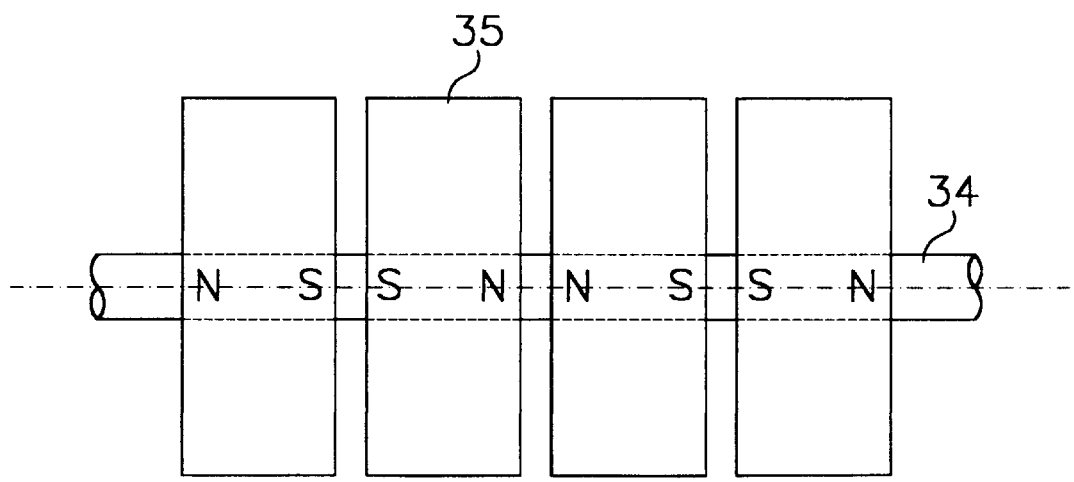

1. The magnets may be formed using a high temperature superconductor film instead of the permanent magnet.
2. As shown in FIG. 1, the structure of thrust bearings which are made of a permanent magnet and a superconductor according to the prior art may be substituted with the structure which uses the high temperature superconductor magnet instead of the permanent magnet for thereby implementing the structure as shown in FIG. 5B.
3. The magnetic flux path formed about the center of the journal as shown in FIG. 4B is removed. In the present invention, the magnetic flux is formed outside of the journal for thereby improving the operation with the high temperature superconductor stator.

4. In order to off-set the force such as the weight applied to the rotating members of the item 3 using the magnetic pressure, the upper semi-cylindrical container and the lower semi-cylindrical container made of the high temperature superconductor 105 of FIG. 7 are spaced apart in an egg shape. The rotating members are positioned a little farther away from the final equilibrium position in the direction opposite to the force while being cooled in a magnetic field. After the cooling, the rotating members settle in the predetermined position. The semi-cylindrical containers may be formed in a shape other than the semi-cylindrical one. When the same is used under the weightless state or is installed in a vertical direction, and when the force applied to the rotor is not uniform, the same may be formed in a cylindrical shape, not the egg-like shape. In all case, the magnets are stacked in opposite polarity. In the embodiment of FIG. 4B, the permanent magnet may be substituted with the high temperature superconductor magnet for thereby forming the rotor.

5. A hybrid-type structure may be adapted in which the magnets are installed in the outside of the high temperature superconductor as shown in FIG. 8 in order to enhance the levitation force as described in the item 4.

6. In the structure as shown in FIG. 8, part of the high temperature superconductor 105 between the upper and lower bearing stator magnets 106 and 107 and the rotor 110 may be eliminated, and the distance between the stator magnet and the rotor may be decreased for thereby improving the levitation force. Various modifications may be possible depending on the purpose of the user and the characteristics. In this case, it is possible to effectively use the attractive and repulsive forces between the magnets and it is possible to reduce the fabrication cost by decreasing the amount of the high temperature superconductors.

7. In the present invention, the magnet may be made of a regular permanent magnet, an electromagnet, a superconductor electromagnet, a superconductor magnet, etc.

8. The poles of the magnets may be reversed like N→S and S→N. Namely, the polarity of the magnets is relative.

In the prior art, even when a large pinning force is generated by installing the rotor magnets of the high temperature superconductor journal bearing stacked in opposing polarity, the rotor axle passes through the central hole of the ring magnets for fixing each magnet, so that the space is not effectively used. However, in the present invention, each magnet is fixed by a thin cylindrical container, so that cylindrical magnets are installed instead of the ring magnets, filling the space of the rotor axle with magnets for thereby improving the effectiveness in usage of space. In the present invention, the hybrid design in which the stator includes the magnets as well as the high temperature superconductors is implemented for thereby increasing the levitation force compared to the prior art in which the high temperature superconductor journal bearing is formed of the rotor and the high temperature superconductor.

According to the prior art, since large rotor magnets of the high temperature superconductor thrust bearings can not be fabricated, a plurality of magnets are connected for thereby forming a rotor magnet and a nonuniform magnetic flux density is formed in the rotational direction. However, in the present invention, the rotor magnets is formed using one high temperature superconductor magnet so that the problem due to the nonuniform magnetic flux density is overcome, that a strong levitation force is generated, and that a high stability is achieved based on the strong pinning by the strong magnetic field of the high temperature superconductor magnet.

In the present invention, the attractive and repulsive forces are used in addition to the pinning force between the magnets and the high temperature superconductor, thereby increasing the efficiency, enabling a stable rotation with a strong levitation force, and also offering a highly cost effective structure.

The high temperature superconductor bearings according to the present invention may be adapted to the flywheel energy storage system. A construction of a high temperature superconductor flywheel energy storage system according to the present invention will be explained. A cooling system, a vacuum unit, a power conversion unit, a control unit, etc., which are used in the prior art are used. Some apparatuses which are considered less important are omitted in the drawings, and the descriptions thereof are also omitted.

Figure 9:
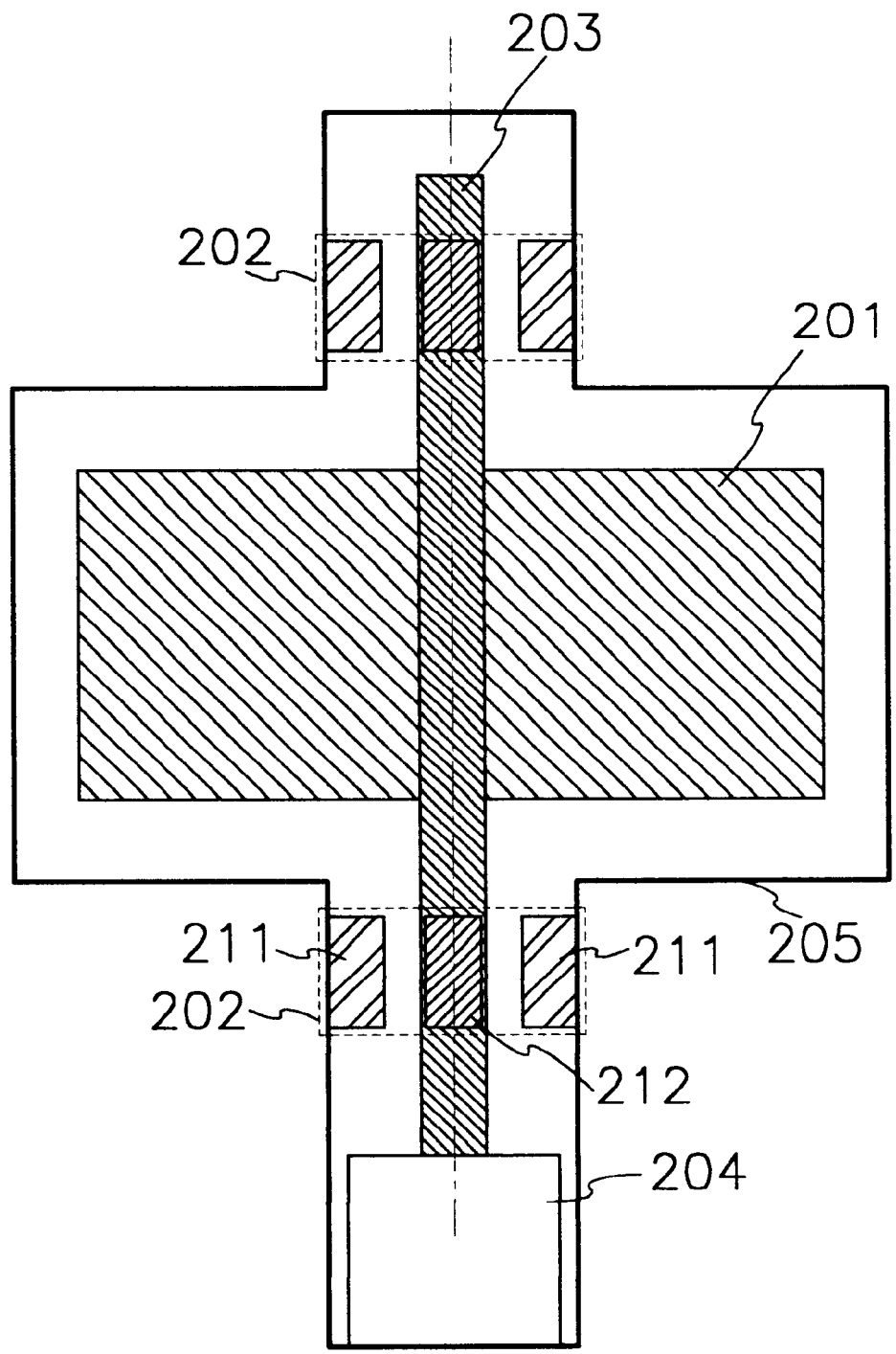
FIG. 9 is a cross-sectional view illustrating a horizontal axle flywheel energy storage system using high temperature superconductor journal bearings formed of one flywheel according to an embodiment of the present invention.

FIG. 9 is a cross-sectional view illustrating the horizontal axle flywheel energy storage system using high temperature superconductor journal bearings.

In the present invention, in the interior of the vacuum/safety container 205, there are provided a flywheel 201 with a large rotational inertia, a high temperature superconductor journal bearing 202 which supports the rotor, and a rotary axle 203 which is installed in the direction perpendicular to the weight.

The journal bearing 202 is formed of the bearing stator 211 including the high temperature superconductor and the rotor 212 including the magnetic member for thereby providing a levitation force in the direction opposite to the weight and pinning forces in various directions.

The flywheel 201 is formed of a material which is capable of enduring high speed rotations for the storage of a high energy density. The vacuum/safety container 205 is designed to reduce or eliminate the air resistance and to protect personnel and other components from any projectile flying out in case of an accident.

The motor/generator 204 is connected to an external power conversion unit and a control unit for thereby decreasing the electromagnetic loss and for thereby removing any mechanical friction by removing the inner bearing.

When the flywheel system is set up horizontally and the high temperature superconductor journal bearings are used to levitate the flywheel system, it is possible to obtain a stronger retaining force in the radial direction of the rotary axle compared to the vertical axle high temperature superconductor flywheel devices made according to the prior art. Therefore, in the present invention, it is possible to achieve a high stability.

Figure 10:
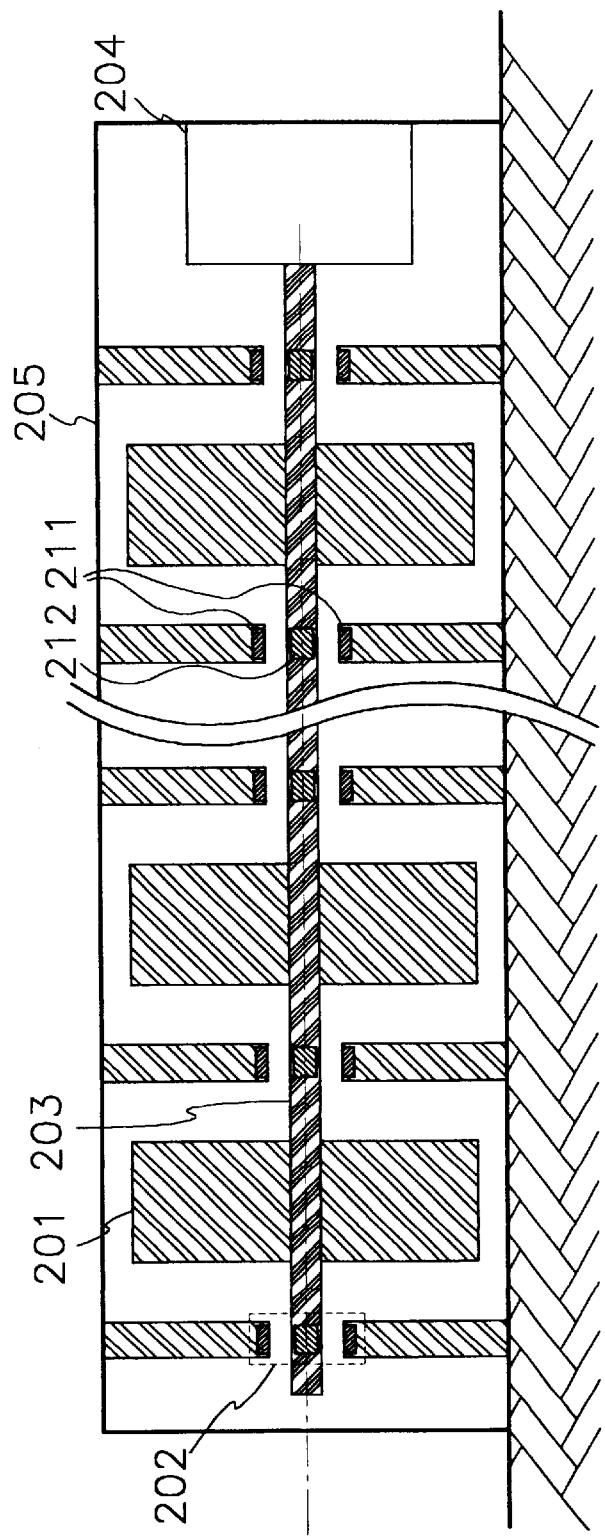
FIG. 10 is a cross-sectional view illustrating the construction that a plurality of flywheels are connected in series with a horizontal axle using high temperature superconductor journal bearings for thereby increasing the capacity of the same according to another embodiment of the present invention.

FIG. 10 illustrates the construction of another embodiment of the present invention. In the horizontal axle flywheel energy storage system which uses high temperature superconductor journal bearings, a plurality of flywheels can be connected in series for thereby achieving a large capacity.

A plurality of flywheels 201 are installed at the rotary axle 203 which is installed in the direction perpendicular to the weight direction, and a plurality of high temperature superconductor journal bearings 202 are installed to uniformly distribute the weight of the rotors and to present bending of he rotary axle.

When increasing the capacity of the horizontal axle flywheel energy storage system using high temperature superconductor journal bearings, the rotary axle is extended in the direction perpendicular to the weight direction. Therefore, it facilitates the fabrication with cost effectiveness and offers stability of the system compared to the vertical axle flywheel energy storage system made according to prior art. It can be readily scaled up by increasing the number of the flywheels, the bearings, and the motor/generators connected horizontally.

In the present invention, high temperature superconductor magnets as well as permanent magnets are used to significantly increase the intensity of the magnetic field and the force between the magnets, so that the magnetic flux pinning high temperature superconductors can generate a large pinning force.

Since it is difficult to fabricate a large size magnet, a plurality of small magnets are connected as the rotor magnets in prior art superconductor thrust bearings, thereby causing a nonuniformity. In the high temperature superconductor journal bearings according to the present invention, a uniform magnetic field is generated in the rotational direction using a large size high temperature superconductor magnet.

In the various high temperature superconductor journal bearing structures according to the present invention, it is assumed that the force applied to the rotor has a predetermined direction and size. In the prior art, only the magnetic pinning force of the high temperature superconductor material is used. In this structure, it is possible to implement a non-contact of the rotor and stator with respect to a stronger force applied to the rotor, using not only the magnetic pinning force of the high temperature superconductor but also using the magnetic force between the magnets.

In the horizontal-axle type flywheel energy storage systems, the stability in the radial direction of the flywheel rotary axle is better than the prior art high temperature superconductor flywheel energy storage systems and the rotor accident is effectively minimized. The fabrication cost is reduced since the active control apparatuses and the multiple storing units are not required in the present invention.

When increasing the capacity of the horizontal-axle type flywheel energy storage systems, the present invention has the following advantages compared to the prior art systems that use the vertical axle flywheels. Since the height of the large capacity flywheel energy storage system by the serial connection of the flywheels is lowered, good stability of the system is achieved and the installation cost is reduced. In addition, its scale-up is facilitated by the addition of a predetermined number of flywheels, bearings, and the motor/generator.

With the above-described advantages, the high temperature superconductor bearings of the present invention can support a heavy flywheel energy storage system with a significantly low rate of rotational losses. The present invention may be adapted for small, intermediate and large size of the energy storage systems and may be adapted for electrical power generators. In addition, the flywheel energy storage device of the present invention can give a large reduction of installation cost and an enhancement of the stability to the flywheel energy storage system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a non-contact journal bearing which is capable of levitating a rotor in a fixed position against forces of its weight comprising:

(a) high temperature superconductor magnet journals made of a high temperature superconductor magnet formed of a high temperature superconductor film for a journal of a rotational axle for producing magnetic flux; and (b) semi-cylindrical stators formed of a plurality of high temperature superconductor pieces installed opposite the high temperature superconductor magnet journal for pinning the magnetic flux of the high temperature superconductor magnet journals and producing magnetic pressure, thereby off-setting the force of the weight of the rotor.

2. The bearing of claim 1, wherein a said high temperature superconductor magnet journal is formed in such a magnets are spaced apart at a predetermined gaps in a non-magnetic material in opposing polarity in the sequence of (N-S)/(S-N)/(N-S)/(S-N) so that the magnetic fields diverge out in the radial direction of the journal.

3. The bearing of claim 1, wherein a said magnet journal forming the rotor is made with a plurality of the magnets stacked in opposing polarity like (N-S)/(S-N)/(N-S)/(S-N) and circular plates of a high magnetic permeability magnets and then is installed in the cylindrical non-magnetic material, so that the magnetic fields diverge out in the radial direction of the journal.

4. The bearing of claim 1, wherein a said high temperature superconductor journal bearing includes a stator formed of high temperature superconductors and of magnets installed outside of the superconductors, so that the levitation force is increased by an attractive force and a repulsive force exerted between the rotor and the stator magnets.

5. The bearing of claim 1, wherein the upper and lower parts of a said bearing stator are made of magnets stacked in opposing polarity to increase the levitation force by an attractive force and a repulsive force exerted between the rotor and the stator magnets, and the left and right remaining portions of the bearing stator are formed of high temperature superconductors to provide a magnetic pinning force to a said bearing rotor.

6. The bearing of claim 1, wherein a said magnet journal forming the rotor is formed in such a manner that ring magnets are stacked in opposing polarity in sequence like (N-S)/(S-N)/(N-S)/(S-N), and circular ring plates formed of a high magnetic permeability material are inserted into the pole surfaces of the magnets, and an axle is inserted into the center of the same for thereby fixing the magnets, and a said stator is formed in a semi-cylindrical shape which is opposite to the bearing journal, and the stator magnets are installed to be opposite to the outer surface of the same, so that the levitation force of the bearing is increased by the attractive and repulsive forces together applied to the rotor.

7. The bearing of claim 1, wherein a said magnet journal forming the rotor is made of ring-type magnets stacked in opposing polarity in a sequence like (N-S)/(S-N)/(N-S)/(S-N), and circular ring plates formed of a high magnetic permeability material are inserted into the pole surfaces of the magnets, and an axle is inserted into the center of the same for thereby fixing the magnets, and a said stator is formed using the magnets installed at the upper and lower parts, and high temperature superconductors installed at the remaining left and right parts, so that the levitation force of the bearing is increased by the attractive and repulsive forces together applied to the rotor.

8. The bearing of claim 1, wherein said magnet is concentric with the rotational axle.

* * * * *